(12) United States Patent
Cooblall et al.

(10) Patent No.: US 11,201,804 B2
(45) Date of Patent: Dec. 14, 2021

(54) SYSTEMS AND METHODS FOR DETECTING CONTROL PLANE NODE AVAILABILITY

(71) Applicant: Verizon Patent and Licensing Inc., Arlington, VA (US)

(72) Inventors: Brian Andrew Cooblall, Massapequa, NY (US); Paul Herbert Siedelhofer, Robbinsville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 40 days.

(21) Appl. No.: 16/395,921

(22) Filed: Apr. 26, 2019

(65) Prior Publication Data

US 2020/0344140 A1      Oct. 29, 2020

(51) Int. Cl.
| | |
|---|---|
| *H04L 12/26* | (2006.01) |
| *H04W 28/02* | (2009.01) |
| *H04W 48/16* | (2009.01) |
| *H04W 88/18* | (2009.01) |
| *H04W 24/00* | (2009.01) |
| *H04W 84/18* | (2009.01) |

(52) U.S. Cl.
CPC ...... *H04L 43/0805* (2013.01); *H04L 43/0852* (2013.01); *H04L 43/0876* (2013.01); *H04W 24/00* (2013.01); *H04W 28/0289* (2013.01); *H04W 48/16* (2013.01); *H04W 88/18* (2013.01); *H04W 84/18* (2013.01)

(58) Field of Classification Search
CPC ............. H04L 43/0805; H04L 43/0852; H04L 43/0876; H04L 43/16; H04W 24/00; H04W 28/0289; H04W 88/18; H04W 48/16; H04W 84/18
See application file for complete search history.

(56) References Cited

U.S. PATENT DOCUMENTS

| | | | |
|---|---|---|---|
| 6,775,234 B1 * | 8/2004 | Garcia-Martin ..... | H04Q 3/0025 370/237 |
| 7,139,768 B1 * | 11/2006 | Janzig ................... | G06F 3/0481 |
| 9,350,616 B1 * | 5/2016 | Lou ......................... | H04L 47/12 |
| 2004/0152471 A1 * | 8/2004 | MacDonald .......... | H04W 4/026 455/456.1 |
| 2015/0363270 A1 * | 12/2015 | Hammer ............. | G06F 11/1451 711/162 |

(Continued)

*Primary Examiner* — Jae Y Lee
*Assistant Examiner* — Mohammed M Murshid

(57) ABSTRACT

A device may detect a communication session between a user equipment and a network. The device may cause, based on detecting the communication session, a set of queries to be transmitted to a plurality of control plane nodes of the network. The device may determine, based on a set of responses associated with the set of queries, respective characteristics for corresponding control plane nodes, of the plurality of control plane nodes. The device may determine, based on the respective characteristics, scores for the corresponding control plane nodes, wherein the scores are representative of respective capabilities of the corresponding control plane nodes to be used for the communication session. The device may select, based on the scores, a control plane node, from the plurality of control plane nodes, for the communication session. The device may configure the control plane node to perform a control operation for the communication session.

20 Claims, 8 Drawing Sheets

(56) References Cited

U.S. PATENT DOCUMENTS

| | | | | |
|---|---|---|---|---|
| 2017/0104651 A1* | 4/2017 | Kakadia | ............... | H04L 12/2854 |
| 2018/0123941 A1* | 5/2018 | Flamini | ................. | H04L 45/124 |
| 2018/0270743 A1* | 9/2018 | Callard | ................... | H04L 45/64 |
| 2020/0059407 A1* | 2/2020 | Lu | ....................... | H04L 41/0893 |
| 2020/0120589 A1* | 4/2020 | Velev | .................... | H04W 76/25 |
| 2020/0120751 A1* | 4/2020 | Sugawara | ............. | H04W 80/10 |
| 2020/0146077 A1* | 5/2020 | Li | ......................... | H04W 76/10 |
| 2020/0154292 A1* | 5/2020 | Bor-Yaliniz | .......... | H04W 24/02 |
| 2020/0260371 A1* | 8/2020 | Wang | .................... | H04W 48/18 |

\* cited by examiner

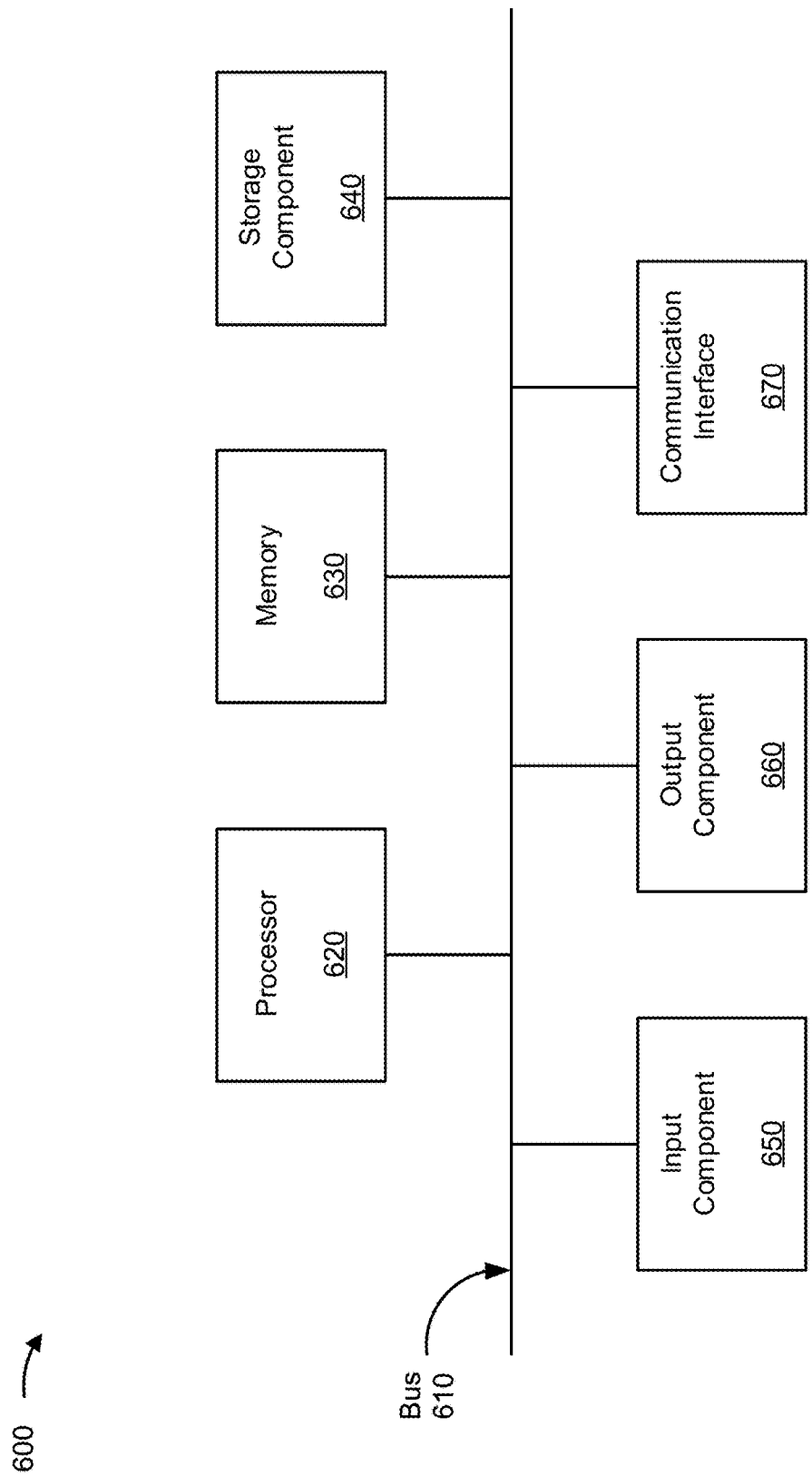

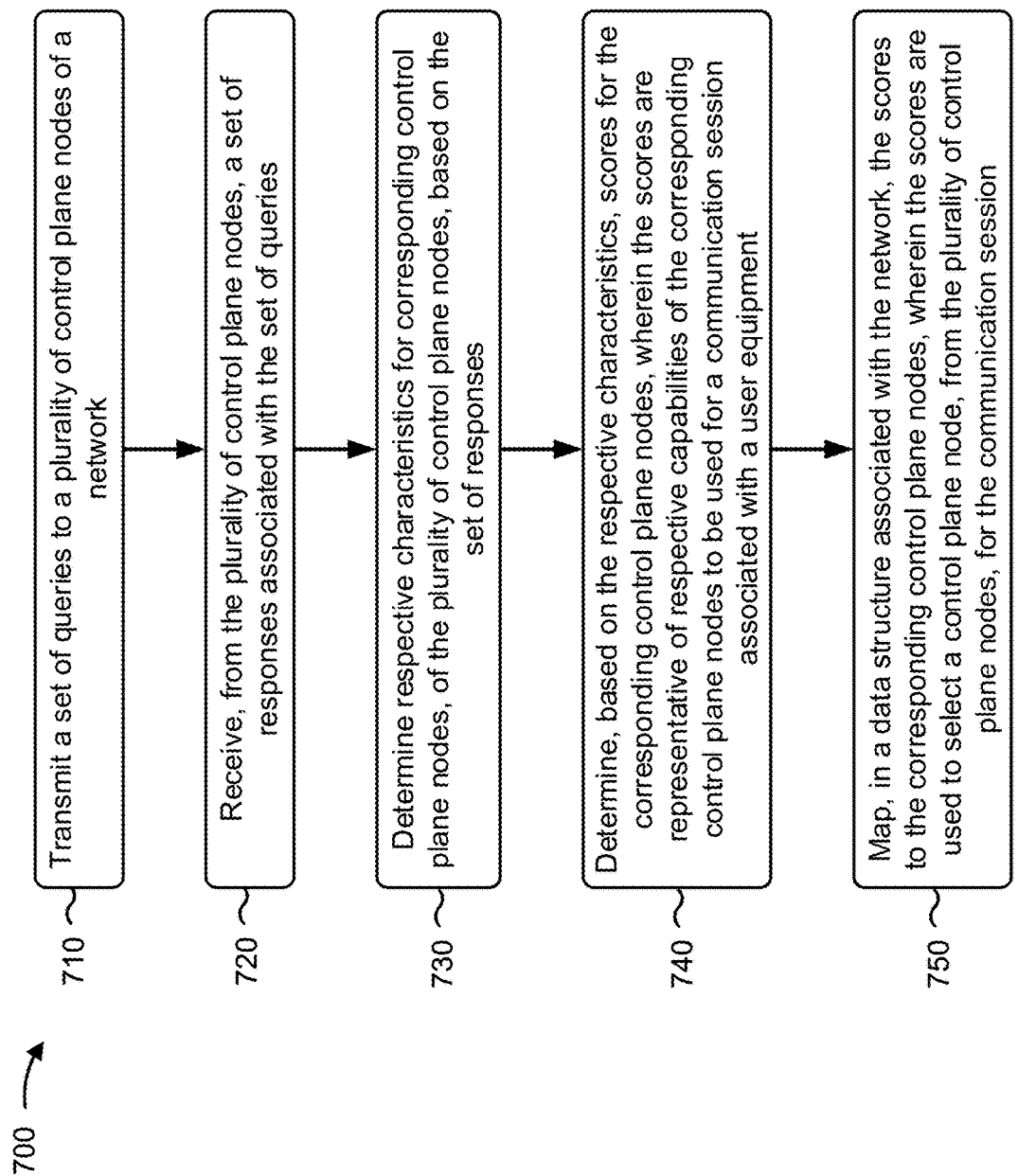

SYSTEMS AND METHODS FOR DETECTING CONTROL PLANE NODE AVAILABILITY

BACKGROUND

5th Generation/New Radio (5G/NR) is a next generation global wireless technology. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

BRIEF DESCRIPTION OF THE DRAWINGS

FIG. 6 is a diagram of example components of one or more devices of FIG. 4 and/or one or more devices associated with the example functional architecture of FIG. 5.

FIG. 7 is a flowchart of an example process for detecting availability of control plane nodes of a network, as described herein.

DETAILED DESCRIPTION OF PREFERRED EMBODIMENTS

Figure 1A:
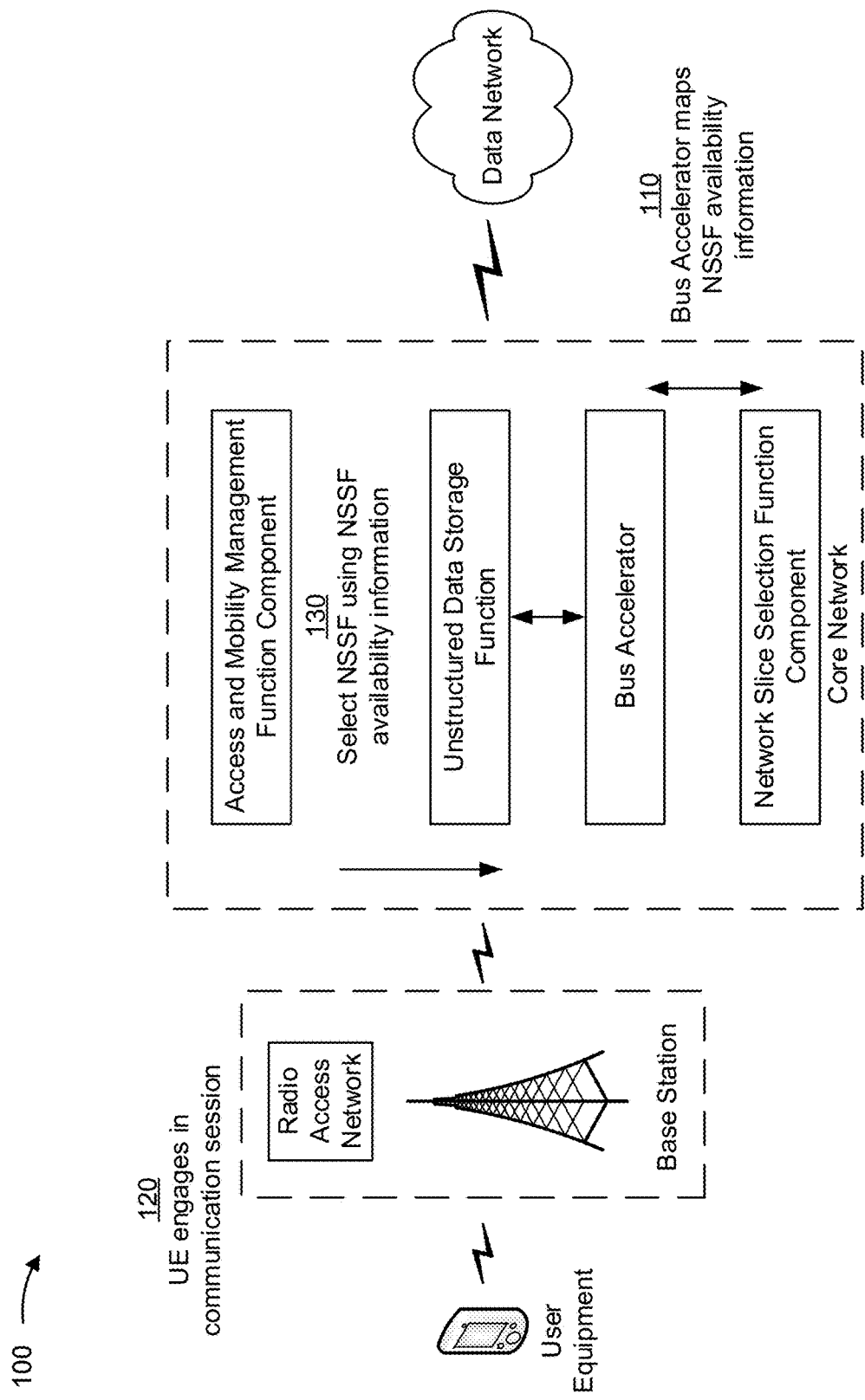
FIGS. 1A and 1B are diagrams of one or more example implementations described herein.

The following detailed description of example implementations refers to the accompanying drawings. The same reference numbers in different drawings may identify the same or similar elements.

In a wireless telecommunications system (which can be referred to herein as "the system"), such as a 5G wireless telecommunications network, network slicing allows for multiple virtual networks to run on a single physical network to support multiple services, applications, and/or entities (e.g., end users, customers, such as organizations that provide a service to end users of the wireless telecommunications systems, and/or the like). In some instances, when a user equipment (UE) requests a connection (e.g., protocol data unit (PDU) connectivity) to the network for an application and/or service, the UE provides the network with information associated with the UE, the application, and/or the service.

In such cases, one or more control plane nodes may be used to establish the communication session for the UE according to the request. For example, in such instances, an Access and mobility Management Function (AMF) may request a Network Slice Selection Function (NSSF) of the system to determine a network slice instance (NSI) and/or other resources to support a communication session for the UE. The NSSF can provide, to the AMF, an NSI identifier (NSI ID) associated with the NSI. Further, the AMF can identify a Session Management Function (SMF) to provision a communication session of a network slice, using the corresponding NSI, for the UE. However, in some instances, one or more of the control plane nodes may not have the availability to establish a communication session within a threshold latency (e.g., a low latency threshold associated with 5G wireless telecommunication networks). Accordingly, sub-optimal (e.g., relative to latency requirements) control plane nodes may be used to establish a communication session.

Some implementations described herein provide a bus accelerator for a core network of a wireless telecommunications system (e.g., a 5G wireless telecommunications system, and/or the like) to enable monitoring and/or identification of most available control plane nodes for a communication session. For example, the bus accelerator may monitor control plane nodes of the core network, determine respective scores of corresponding control plane nodes (e.g., based on one or more characteristics of the control plane nodes), and maintain the availability scores in a mapping (e.g., of an Unstructured Data Storage Function (UDSF)) to permit the communication session to be established for a UE with relatively less latency than previous techniques. In this way, one or more PDUs for the communication session may not be dropped (e.g., due to the latency exceeding a low latency threshold of the communication session), which wastes computing resources (e.g., processing resources and memory resources associated with generating and/or providing the PDUs) and/or network resources (e.g., network resources used to transmit the dropped PDUs). Furthermore, computing resources (e.g., processing resources and/or memory resources) associated with one or more control plane nodes of a core network and/or network resources (e.g., resource blocks) associated with the core network are not wasted by over loading the one or more control plane nodes that have limited or no availability to establish a communication session for a UE.

Figure 1B:
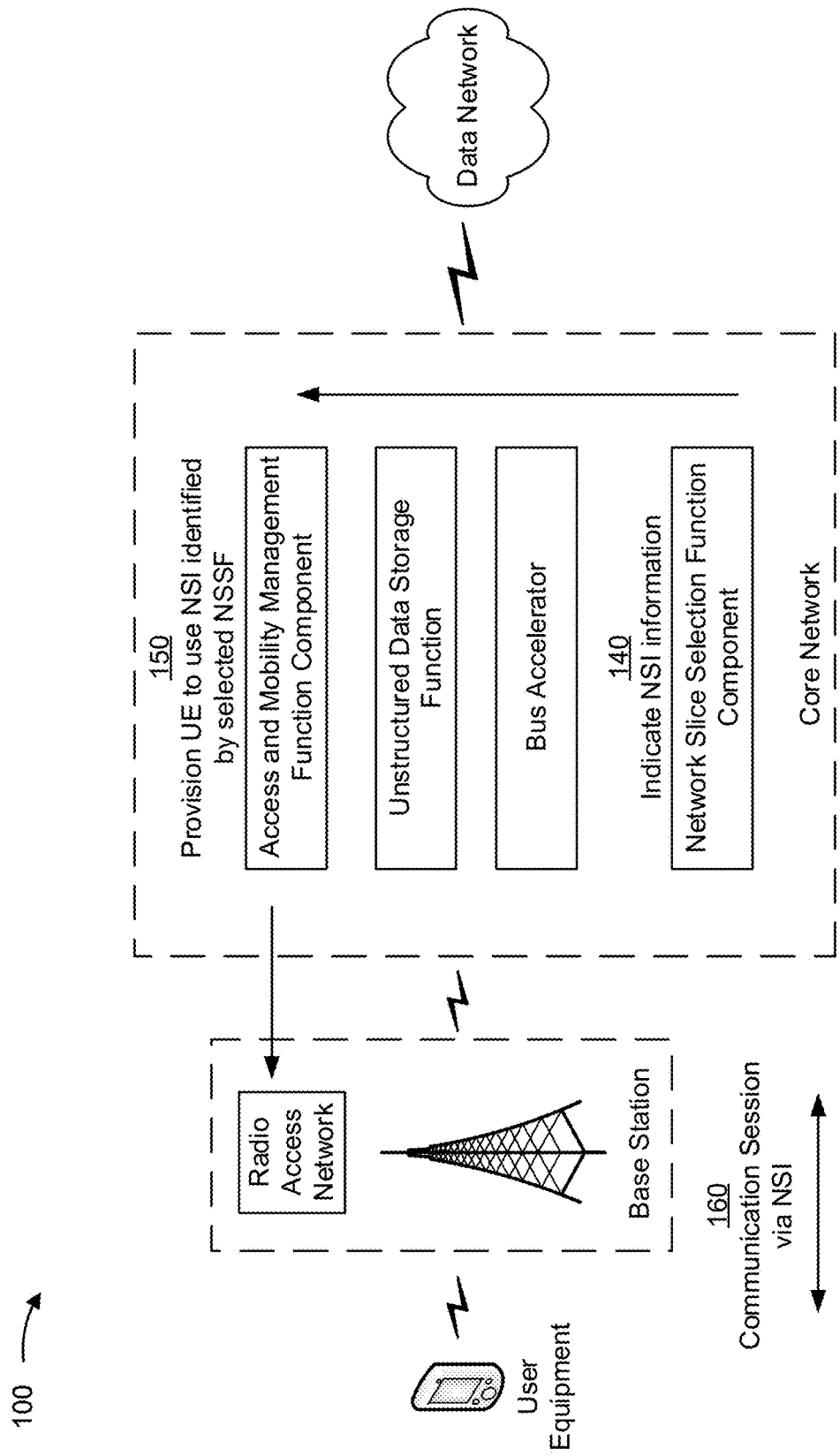

FIGS. 1A and 1B are diagrams of an example implementation 100 described herein. Example implementation 100 illustrates various portions of a wireless telecommunications system (referred to herein as a "wireless network"), which in some implementations can be a 5G wireless telecommunications system, a 4G wireless telecommunications system, a long-term evolution (LTE) wireless telecommunications system, an LTE-Advanced (LTE-A) wireless telecommunications system, and/or the like.

As shown in FIGS. 1A and 1B, example implementation 100 can include a UE wirelessly connected to a radio access network (RAN) at a base station, which is connected to a data network via a core network. The UE can run an application that involves communicating with the data network, and therefore the UE can enter into a communication session (e.g., a PDU session) with the data network via the RAN and/or core network. The UE and the core network can communicate application-specific data during the communication session. In some implementations, to permit the UE to enter into the communication session with the data network, the UE can send an initial request to register with the core network.

The UE of example implementation 100 can be a communication and/or computing device, such as a mobile phone, a smartphone, a laptop computer, a tablet computer, an Internet of Things device, and/or the like. The base station of example implementation 100 can include an access point of a RAN, such as a 5G next generation NodeB (gNodeB or gNB), a LTE evolved NodeB (eNodeB or eNB), and/or the like. In some implementations, the base station facilitates a communication session by communicating application-specific data between the UE and the core network via a wired, optical or wireless connection.

The core network of example implementation 100 can include various types of telecommunications core networks, such as a 5G next generation (5G NG) core network, an LTE evolved packet core (EPC) network, and/or the like. As shown in FIGS. 1A and 1B, the core network, among other components and/or functions, can include a bus accelerator component, an AMF component, an NSSF component, and a UDSF component. In some implementations, the bus accelerator, the AMF, the NSSF, the UDSF, and/or other components or functions may not be co-located or are not co-located (e.g., each component and/or function of the core network can be at a different location from each other component and/or function of the core network). The NSSF of example implementation 100 may be one of a plurality of NSSFs of the core network.

The AMF of example implementation 100 can provide authentication and/or authorization of the UE. In some implementations, an Authentication Server Function (AUSF) component assists the AMF in authenticating and/or authorizing the UE to engage in a communication session. Additionally, or alternatively, the AMF can coordinate with a Unified Data Management (UDM) component to obtain subscription information associated with the UE (e.g., information that identifies services of the wireless communication that are available to the UE). As described herein, the bus accelerator may monitor, determine, and/or indicate availability of the NSSF. For example, the bus accelerator can maintain (e.g., in the UDSF) a mapping of availability of the NSSF. The mapping of availability may indicate the availability of the NSSF according to one or more characteristics of the NSSF. In some implementations, the UDSF may be part of the bus accelerator and/or co-located with the bus accelerator. Accordingly, the bus accelerator can indicate availability of the NSSF and/or maintain a mapping of availability of the NSSF to permit the AMF to select the NSSF to be used for a communication session with the UE.

In some implementations, the NSSF can determine a set of network slice policies to be considered when selecting an NSI. The set of network policies can set rules and/or requirements at a network level (e.g., for all or a subset of UEs, for all or specific applications, for all or specific geographic areas, and/or the like) and/or a user level (e.g., per UE, per application, and/or the like). The set of network slice policies, which can be maintained by a Policy Control Function (PCF) component of the core network, can include an area capacity policy (e.g., a data rate capacity over an area), a mobility policy (e.g., location and speeds of UEs), a density policy (e.g., a number of communications sessions over an area), a guaranteed minimum data rate policy (e.g., minimum download and upload speeds), a maximum bitrate policy (e.g., maximum download and upload bitrates), a relative priority policy (e.g., relative importance of the application and/or UE compared to other applications and/or UEs), an absolute priority policy (e.g., objective importance of the application and/or UE compared to other applications and/or UEs), a latency rate policy (e.g., an end-to-end communications transmission time), a reliability policy (e.g., a communications transmission success rate), a resource scaling policy (e.g., an ability or range for scaling resources up or down), and/or the like. In some implementations, the set of network slice policies can define a low latency performance requirement (e.g., an end-to-end communications transmission time less than or equal to a threshold, such as about 10 ms), a high latency performance requirement (e.g., an end-to-end communications transmission time greater than a threshold, such as about 10 ms), a low reliability performance requirement (e.g., a communications transmission success rate less than a threshold, such as 99.99%), a high reliability performance requirement (e.g., a communications transmission success rate greater than or equal to a threshold, such as 99.99%), a high data rate performance requirement (e.g., download and upload speeds above a threshold, such as about 50 Mbps), a low data rate performance requirement (e.g., download and upload speeds less than or equal to a threshold, such as about 50 Mbps), a high traffic density requirement (e.g., greater than or equal to a threshold number of user devices per geographical area, such as about 10,000 user devices per square kilometer), and/or a low traffic density requirement (e.g., less than a threshold number of user devices per geographical area, such as about 10,000 user devices per square kilometer). In some implementations, the set of network slice policies can define a category for a service of a communication session.

The data network of example implementation 100 can include various types of data networks, such as the Internet, a third-party services network, an operator services network, a private network, a wide area network, and/or the like.

Although some implementations described herein describe the bus accelerator monitoring and/or determining availability of the NSSF (and/or a corresponding plurality of NSSFs), the bus accelerator may similarly monitor and/or determine availability associated with one or more other types of control plane nodes of the core network (e.g., AMFs, SMFs, UDMs, AUSFs, and/or the like).

As shown in FIG. 1A, and by reference number 110, the bus accelerator maps NSSF availability information. For example, the bus accelerator may monitor (e.g., continuously, periodically, according to a schedule, and/or the like) the NSSF to determine one or more characteristics of the NSSF that indicate an availability of the NSSF. Such characteristics may include a congestion level of the NSSF, an average service time associated with the NSSF, a bearer availability (e.g., corresponding to a number of available NSIs of the NSSF) associated with the NSSF, and/or the like. As described herein, the NSSF availability information may indicate an availability of the NSSF (and/or one or more other NSSFs of the core network) to be used for a communication session with the UE. In some implementations, the bus accelerator may determine and/or map the NSSF availability information based on detecting that the UE is involved in a communication session associated with the core network.

As described herein, the bus accelerator may monitor the availability of the NSSF and/or determine the availability of the NSSF by one or more communications with the NSSF. For example, the bus accelerator may send a set of transport layer queries (e.g., Layer 4 (L4) messages, such as transport control protocol/Internet protocol (TCP/IP) messages, user datagram protocol (UDP) messages, and/or the like) and/or receive one or more transport layer messages from the NSSF (e.g., responses associated with the transport layer queries, status messages indicating an availability of the NSSF, and/or the like).

In some implementations, the NSSF may determine the availability of the NSSF by calculating an availability score associated with the NSSF. The availability score may be based on measurements associated with the characteristics of the NSSF. Accordingly, the availability score of the NSSF may be compared to other availability scores for other NSSFs of the core network to permit the AMF to select the NSSF to be used for the communication session with the UE. Therefore, the bus accelerator may map availability information for a plurality of NSSFs of the core network.

In this way, the bus accelerator may monitor, determine, and/or map availability information associated with the NSSF.

As further shown in FIG. 1A, and by reference number 120, the UE may engage in a communication session (e.g., a PDU session) with the core network via the RAN. The UE may be associated with transmitting data (e.g., traffic) of a user data plane of the network. For example, the communication session may involve the UE transmitting data via the user data plane of the network. In some implementations, the UE may send a UE configuration request message to the base station of the RAN to register the UE with the core network and/or initiate the communication session between the UE and the data network. Additionally, or alternatively, the UE may send the UE configuration request message to cause the core network to update a User Plane Function (UPF) for the communication session (e.g., based on a handoff of the UE to the base station from another base station). In such instances, the UE may send the configuration request to maintain and/or continue the communication session.

According to some implementations, the bus accelerator may maintain availability information for the AMF. In such cases, the RAN can use availability information that is mapped and/or stored by the bus accelerator in the UDSF to perform an AMF selection process to identify the AMF of the core network that is to be used to set up the communication session. For example, as described herein, the RAN may select the AMF of the core network that is most available according to congestion levels, average service time, bearer availability, and/or the like.

In this way, the UE may engage in a communication session with the core network via the RAN and/or the RAN may select the AMF for the communication session.

As further shown in FIG. 1A, and by reference number 130, the AMF selects the NSSF for the communication session based on the NSSF availability information. For example, the AMF may select the NSSF from a plurality of NSSFs of the core network based on the NSSF availability information indicating that the NSSF of FIG. 1A is the most available NSSF of the core network.

In some implementations, the AMF performs an authentication process and/or authorization process associated with the UE. For example, the AMF can perform the authentication process to authenticate the request and/or verify that the request was received from the UE identified in the request. Furthermore, the AMF can perform the authorization process to authorize the UE to register and/or communicate as part of the wireless network based on subscription information associated with the UE and/or one or more other characteristics of the UE.

Once the AMF authenticates and/or authorizes the UE, the AMF can select the NSSF to determine an NSI for the communication session. For example, as described herein, to select the NSSF, the AMF can utilize the mapping (e.g., a lookup table) of the NSSF availability information that is generated and/or mapped by the bus accelerator. In some implementations, the AMF may instruct the bus accelerator to provide the NSSF availability information and/or indicate a most available NSSF (e.g., according to the mapped NSSF availability information). The AMF can compare the availability information in the mapping that is associated with a plurality of NSSFs (e.g., available NSSFs for the communication session) of the core network. Once selected, the AMF may cause (e.g., instruct, authorize, and/or the like) the selected NSSF to determine the NSI for the communication session.

In this way, the AMF may select an NSSF for the communication session based on analyzing availability information generated and/or mapped by the bus accelerator.

As shown in FIG. 1B, and by reference number 140, the selected NSSF indicates the NSI information to the AMF. The NSI information may include information identifying a particular NSI that is to be used for the communication. For example, the NSSF can provide an identifier (e.g., an NSI ID) from an NSI run-time table maintained by the NSSF. The NSI run-time table may indicate available NSIs associated with NSSF. Additionally, or alternatively, the NSSF may indicate available NSIs to the AMF, and the AMF can use the NSI run-time table to perform one or more operations associated with the indicated NSI. In this way, the NSSF can indicate, to the AMF, NSI information for the communication session.

As further shown in FIG. 1B, and by reference number 150, the AMF may provision the UE to use the NSI identified by the selected NSSF. For example, the AMF can provision the UE to use the NSI in order to register the UE as part of the wireless network and/or enable the UE to engage in a communication session with the data network via the NSI. In some implementations, the AMF, when receiving and/or sending messages (e.g., PDUs) from and/or to the UE, can use the physical resources associated with the NSI to permit the messages to be received or sent.

As further shown in FIG. 1B, and by reference number 160, the UE can engage in the communication session via the NSI.

Accordingly, as described herein, the bus accelerator may decrease latency (e.g., relative to previous techniques) with respect to establishing a communication session for a UE by enabling a most available control plane node (e.g., a most available NSSF) to be used for the communication. Accordingly, data associated with the communication may not be dropped (e.g., due to latency associated with communicating the data exceeding a latency threshold). In this way, computing resources and/or network resources associated with establishing a communication session may be conserved (e.g., by preventing data associated with the communication from being dropped).

As indicated above, FIGS. 1A and 1B are provided as one or more examples. Other examples can differ from what is described with regard to FIGS. 1A and 1B.

Figure 2:
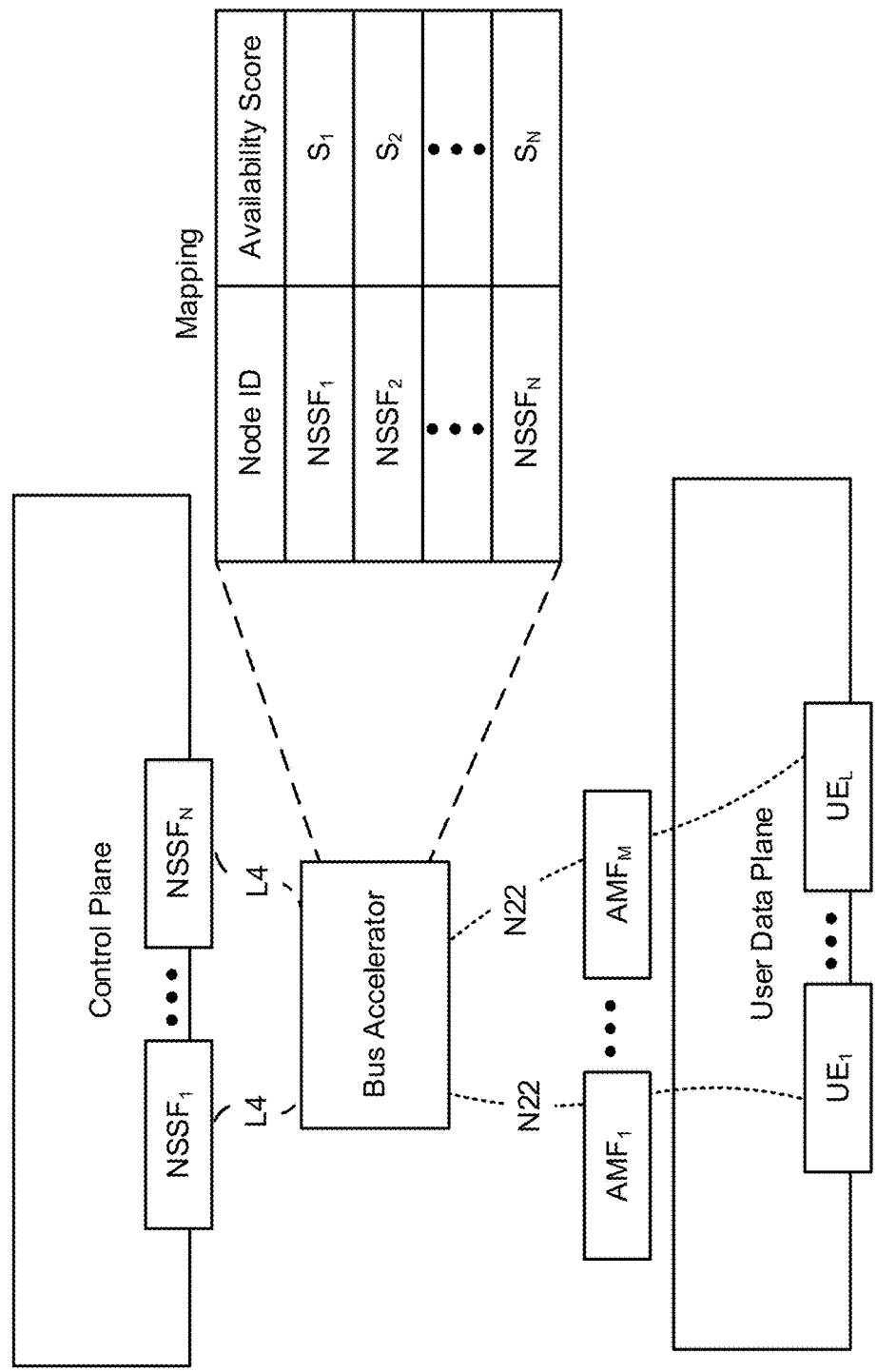
FIG. 2 is a diagram of an example implementations described herein.

FIG. 2 is a diagram of an example implementation 200 described herein. Example implementation 200 includes a bus accelerator (which may correspond to the bus accelerator of FIGS. 1A and 1B), a control plane with a plurality of NSSFs (shown as $NSSF_1$ to $NSSF_N$, one of which may be the NSSF of FIGS. 1A and 1B), a user data plane associated with a plurality of UEs (shown as $UE_1$ to $UE_L$), a plurality of AMFs (shown as $AMF_1$ to $AMF_M$), and a mapping generated by the bus accelerator based on determined availability of the NSSFs as described herein. The control plane and the user data plane may be associated with a wireless communication system. The UEs and/or AMFs may communicate via standard communication interfaces (e.g., N22 communications or other communication standards) and/or the AMFs may communicate with the bus accelerator via one or more of the same or different standard communication interfaces.

In example implementation 200, the bus accelerator may monitor a control plane of the network and generate a mapping of availability scores for the plurality of NSSFs of the network to permit one or more of the NSSFs to be selected for a communication session as described herein. Accordingly, example implementation 200 may correspond to one or more operations performed by the bus accelerator in example implementation 100 with respect to reference number 110.

As described herein, the bus accelerator may determine the availability of one or more of the NSSFs according to one or more characteristics of each of the NSSFs. For example, such characteristics may include one or more of a congestion level of an NSSF, an average service time of the NSSF, and/or a bearer availability of the NSSF. As shown in FIG. 2, the bus accelerator may send communications (e.g., L4 sets of queries) to the NSSFs of the control plane and/or receive communications (e.g., L4 sets of responses to the sets of queries) from the NSSFs of the control plane. Using the L4 communications for example, the bus accelerator may measure values associated with the characteristics of the NSSFs to determine the availability of the NSSFs.

For example, to measure a congestion level of an NSSF of the control plane in FIG. 2, the bus accelerator may track and/or determine a length of time between transmitting an L4 query to the NSSF and receiving a corresponding response to the query from the NSSF. Additionally, or alternatively, the bus accelerator may measure the average service time for the NSSF. For example, to measure the average service time, the bus accelerator may send a plurality of queries to the NSSF. The bus accelerator may then track and/or determine a length of time between transmitting a first query (e.g., an initial query) of the plurality of queries and receiving a response to a last query of the plurality of queries (e.g., a final response to a final query of the transmitted plurality of queries). Based on the number of queries in the plurality of queries that were sent, the bus accelerator may determine the average service time (e.g., by computing a mean, by identifying a mode, by identifying a median, and/or the like). Furthermore, in some implementations, the bus accelerator may determine the bearer availability associated with the NSSF. For example, the bus accelerator may request (e.g., via an L4 query) that the NSSF indicate (e.g., via an L4 response), a number of NSIs associated with the NSSF (e.g., a number of available NSIs of the NSSF). The number of available NSIs may correspond to the bearer availability of the NSSF. In this way, the bus accelerator may use sets of queries to the NSSFs and/or sets of responses from the NSSFs to determine availability of the NSSFs and/or determine availability scores of the NSSFs.

In some implementations, the bus accelerator can utilize a scoring system (e.g., an availability scoring system) to determine a score (e.g., an availability score) associated with an availability of a control node (e.g., one or more of the plurality of NSSFs) based on characteristics of the control node, characteristics of the UE, and or the like. For example, using such a scoring system, the bus accelerator can apply weights (w) to parameters corresponding to the characteristics of the NSSFs (e.g., a congestion level, an average service time, a bearer availability, and/or the like), characteristics of the UE (e.g., a location, subscription status, signal characteristics, and/or the like), and/or the like. Accordingly, the bus accelerator can determine (e.g., via one or more calculations associated with the scoring system) scores for a set of NSSFs based on the scoring system that are representative of the availabilities of the NSSFs. For example, the bus accelerator can use the following to determine the score ($s_{ij}$) based on three characteristics a, b, c of NSSF i for a UE j:

$$s_{ij} = w_{aj}a_i + w_{bj}b_i + w_{cj}c_i + \ldots \quad (1)$$

where $w_{aj}$, $w_{bj}$, $w_{cj}$ correspond to adjusted weights based on the relevance (e.g., settings, preferences, and/or the like) to the UE j for values of parameters $a_i$, $b_i$, $c_i$, that correspond to NSSF i. For example, parameters $a_i$, $b_i$, $c_i$ may each include a value (e.g., a characteristic-specific score) associated with a scale for the respective characteristics associated with parameters $a_i$, $b_i$, $c_i$. Additionally, or alternatively, the adjusted weights $w_{aj}$, $w_{bj}$, $w_{cj}$ may be normalized (e.g., where $0 \leq w_{aj}, w_{bj}, w_{cj} \leq 1$ and $w_{aj} + w_{bj} + w_{cj} = 1$). In this way, the bus accelerator may use a scoring system to determine the availability of each of the NSSFs of the control plane for a communication session with one or more of the UEs.

As shown in FIG. 2, the bus accelerator may maintain the scores for the NSSFs in a mapping. In some implementations, the mapping may be stored in the UDSF of the network (e.g., the UDSF of the core network of FIG. 1A).

In this way, the bus accelerator (and/or an AMF or other element of the network) may utilize the mapping to determine availability of NSSFs of a control plane and/or enable a most available control plane node to be selected (e.g., according to the indicated availability scores) for a communication session involving one or more the UEs in the user data plane.

As indicated above, FIG. 2 is provided as an example. Other examples can differ from what is described with regard to FIG. 2.

Figure 3:
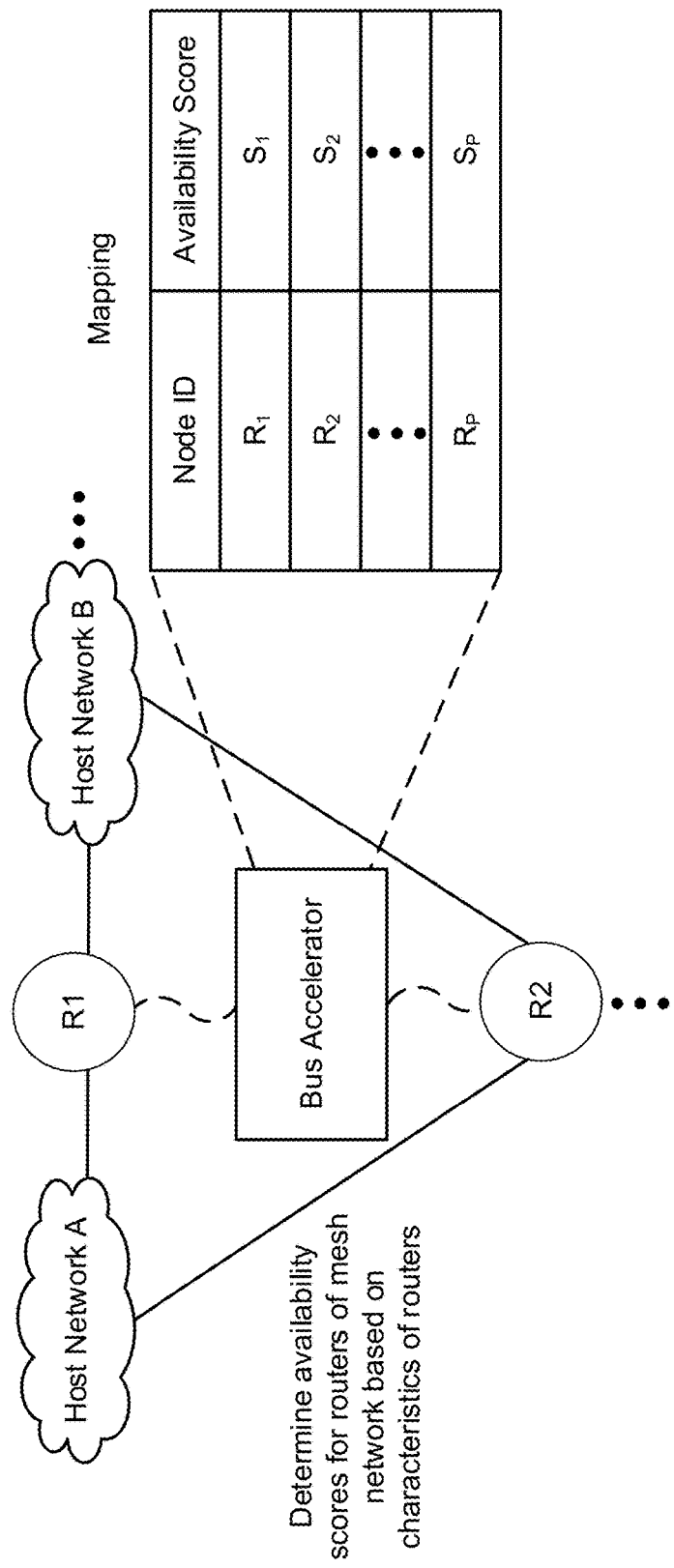
FIG. 3 is a diagram of an example implementations described herein.

FIG. 3 is a diagram of an example implementation 300 described herein. Example implementation 300 includes a bus accelerator, a plurality of host networks (shown as "Host Network A," "Host Network B," . . . ), a plurality of routers (shown as "R1," "R2," . . . ), and a mapping generated by the bus accelerator based on availability of the routers, as described herein. The plurality of routers may correspond to a mesh network. Similar to determining the availability of the NSSFs of FIGS. 1A, 1B, and/or 2, the bus accelerator may determine availability of the routers in example implementation 300. For example, the bus accelerator of example implementation 300 may determine a congestion level of each of the routers, may determine an average service time of each of the routers, and/or may determine a bearer availability (e.g., or available bandwidth) of each of the routers, to determine corresponding availability scores for the routers (as shown in the mapping). In this way, the bus accelerator may permit an optimal (e.g., according to a scoring system of the bus accelerator) route for traffic to be communicated between the plurality of host networks.

As indicated above, FIG. 3 is provided as an example. Other examples can differ from what is described with regard to FIG. 3.

Figure 4:
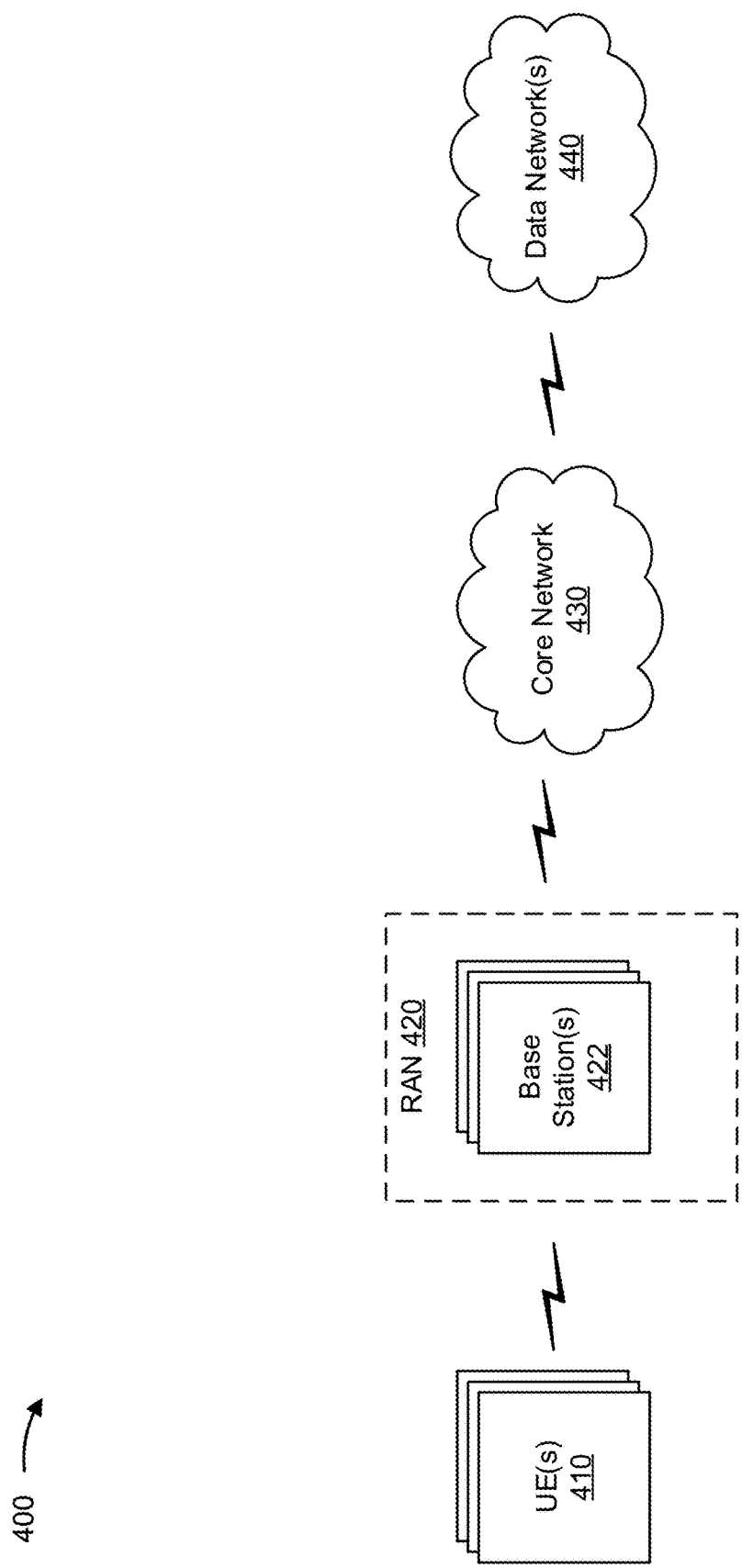
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include one or more UEs 410 (referred to herein individually as "UE 410" or collectively as "UEs 410"), a RAN 420, one or more base stations 422 (referred to herein individually as "base station 422" or collectively as "base stations 422"), a core network 430, and a data network 440. Devices of environment 400 may interconnect via wired connections, wireless connections, or a combination of wired and wireless connections.

UE 410 may include one or more devices capable of communicating with base station 422 and/or a network (e.g., data network 440). For example, UE 410 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a UE, and/or a similar device. UE 410 may be capable of communicating using uplink (e.g., UE to base station) communications, downlink (e.g., base station to UE) communications, and/or sidelink (e.g., UE-to-UE) communications. In some implementations, UE 410 may include a machine-type communication (MTC) UE, such as an evolved or enhanced MTC (eMTC) UE. In some implementations, UE 410 may include an Internet of Things (IoT) UE, such as a narrowband IoT (NB-IoT) UE and/or the like.

RAN 420 can include a base station and be operatively connected, via a wired, optical, and/or wireless connection, to the core network 430 through a UPF of the core network. RAN 420 can facilitate communication sessions between UEs and data network 440 by communicating application-specific data between RAN 420 and core network 430. Data network 440 can include various types of data networks, such as the Internet, a third party services network, an operator services network, a private network, a wide area network, and/or the like.

Base station 422 includes one or more devices capable of communicating with UE 410 using a cellular RAT. For example, base station 422 can include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 422 can transfer traffic between UE 410 (e.g., using a cellular RAT), other base stations 422 (e.g., using a wireless interface or a backhaul interface, such as a wired backhaul interface), and/or data network 440. Base station 422 can provide one or more cells that cover geographic areas. Some base stations 422 can be mobile base stations. Some base stations 422 can be capable of communicating using multiple RATs.

In some implementations, base station 422 can perform scheduling and/or resource management for UEs 410 covered by base station 422 (e.g., UEs 410 covered by a cell provided by base station 422). In some implementations, base stations 422 can be controlled or coordinated by a network controller, which can perform load balancing, network-level configuration, and/or the like. The network controller can communicate with base stations 422 via a wireless or wireline backhaul. In some implementations, base station 422 can include a network controller, a self-organizing network (SON) module or component, or a similar module or component. In other words, a base station 422 can perform network control, scheduling, and/or network management functions (e.g., for other base stations 422 and/or for uplink, downlink, and/or sidelink communications of UEs 410 covered by the base station 422). In some implementations, base station 422 can include a central unit and multiple distributed units. The central unit can coordinate access control and communication with regard to the multiple distributed units. The multiple distributed units can provide UEs 410 and/or other base stations 422 with access to data network 440.

Core network 430 can include various types of core network architectures, such as a 5G Next Generation (5G NG) Core (e.g., core network 500 of FIG. 5), an LTE EPC, and/or the like. In some implementations, core network 430 can be implemented on physical devices, such as a gateway, a mobility management entity, and/or the like. In some implementations, the hardware and/or software implementing core network 430 can be virtualized (e.g., through use of network function virtualization and/or software-defined networking), thereby allowing for the use of composable infrastructure when implementing core network 430. In this way, networking, storage, and compute resources can be allocated to implement the functions of core network 430 in a flexible manner, as opposed to relying on dedicated hardware and software to implement these functions.

Data network 440 includes one or more wired and/or wireless data networks. For example, data network 440 can include an Internet Protocol (IP) Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
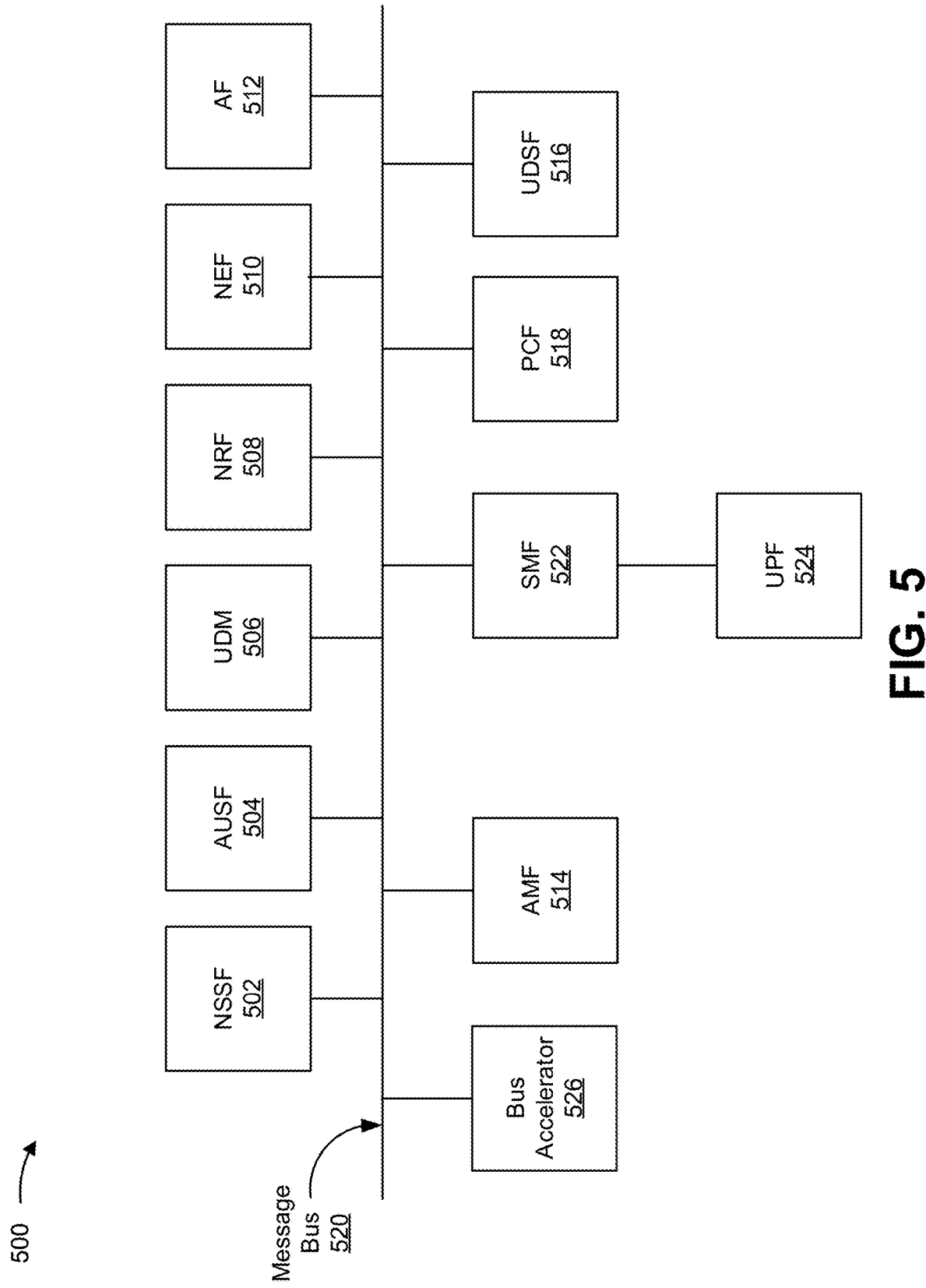
FIG. 5 is a diagram of an example functional architecture of an example core network described herein.

FIG. 5 is a diagram of an example functional architecture of a core network 500 in which systems and/or methods, described herein, can be implemented. For example, FIG. 5 shows an example functional architecture of a 5G NG core network included in a 5G wireless telecommunications system. In some implementations, the example functional architecture can be implemented by a core network (e.g., core network 430 of FIG. 4) and/or one or more devices (e.g., a device described with respect to FIG. 6). While the example functional architecture of core network 500 shown in FIG. 5 can be an example of a service-based architecture, in some implementations, core network 500 can be implemented as a reference-point architecture.

As shown in FIG. 5, core network 500 can include a number of functional elements. The functional elements can include, for example, an NSSF 502, an AUSF 504, a UDM 506, a Network Resource Function (NRF) 508, a Network Exposure Function (NEF) 510, an Application Function (AF) 512, an AMF 514, a UDSF 516, a PCF 518, a message bus 520, an SMF 522, a UPF 524, and a bus accelerator 526. These functional elements can be communicatively connected via a message bus 520, which can comprise one or more physical communication channels and/or one or more virtual communication channels. Each of the functional elements shown in FIG. 5 can be implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system. In some implementations, the core network 500 can be operatively connected to a RAN (e.g., RAN 420), a data network (e.g., data network 440), and/or the like, via wired and/or wireless connections with UPF 524.

NSSF 502 can select network slice instances for UEs, where NSSF 502 can determine a set of network slice policies to be applied at the RAN 420. By providing network slicing, NSSF 502 allows an operator to deploy multiple substantially independent end-to-end networks potentially with the same infrastructure. In some implementations, each slice can be customized for different services. NEF 510 can support the exposure of capabilities and/or events in the wireless telecommunications system to help other entities in the wireless telecommunications system discover network services and/or utilize network resources efficiently.

AUSF 504 can act as an authentication server and support the process of authenticating UEs in the wireless telecommunications system. UDM 506 can store subscriber data and profiles in the wireless telecommunications system. UDM 506 can be used for fixed access, mobile access, and/or the like, in core network 500. PCF 518 can provide a policy framework that incorporates network slicing, roaming, packet processing, mobility management, and/or the like.

AF 512 can determine whether UEs provide preferences for a set of network slice policies and support application influence on traffic routing, access to NEF 510, policy control, and/or the like. AMF 514 can provide authentication and authorization of UEs. UDSF 516 includes one or more data structures configured to store information, mappings, and/or the like associated with the core network 500.

SMF 522 can support the establishment, modification, and release of communication sessions in the wireless telecommunications system. For example, SMF 522 can configure traffic steering policies at UPF 524, enforce UE IP address allocation and policies, and/or the like. AMF 514 and SMF 522 can act as a termination point for Non Access Stratum (NAS) signaling, mobility management, and/or the like. SMF 522 can act as a termination point for session management related to NAS. RAN 420 can send information (e.g. the information that identifies the UE) to AMF 514 and/or SMF 522 via PCF 518.

UPF 524 can serve as an anchor point for intra/inter Radio Access Technology (RAT) mobility. UPF 524 can apply rules to packets, such as rules pertaining to packet routing, traffic reporting, handling user plane QoS, and/or the like. UPF 524 can determine an attribute of application-specific data that is communicated in a communication session. UPF 524 can receive information (e.g., the information that identifies the communications attribute of the application) from RAN 420 via SMF 522 or an API. Message bus 520 represents a communication structure for communication among the functional elements. In other words, message bus 520 can permit communication between two or more functional elements. Message bus 520 can be a message bus, HTTP/2 proxy server, and/or the like.

Bus accelerator 526 may monitor one or more of the elements of core network 500, as described herein. For example, bus accelerator 526 may communicate with (e.g., via transport layer messages) NSSF 502 to determine an availability of NSSF 502. Bus accelerator 526 may store information associated with an availability (e.g., scores representing the availability of the elements) of the one or more elements of core network 500 in a mapping in UDSF 516.

The number and arrangement of functional elements shown in FIG. 5 are provided as an example. In practice, there can be additional functional elements, fewer functional elements, different functional elements, or differently arranged functional elements than those shown in FIG. 5. Furthermore, two or more functional elements shown in FIG. 5 can be implemented within a single device, or a single functional element shown in FIG. 5 can be implemented as multiple, distributed devices. Additionally, or alternatively, a set of functional elements (e.g., one or more functional elements) of core network 500 can perform one or more functions described as being performed by another set of functional elements of core network 500.

FIG. 6 is a diagram of example components of a device 600. Device 600 may correspond UE 410, base station 422, NSSF 502, AUSF 504, UDM 506, NRF 508, NEF 510, AF 512, AMF 514, UDSF 516, PCF 518, message bus 520, SMF 522, UPF 524, and/or a bus accelerator 526. In some implementations, UE 410, base station 422, NSSF 502, AUSF 504, UDM 506, NRF 508, NEF 510, AF 512, AMF 514, UDSF 516, PCF 518, message bus 520, SMF 522, UPF 524, and/or bus accelerator 526 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among multiple components of device 600. Processor 620 is implemented in hardware, firmware, and/or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 includes a component that provides output information from device 600 (via, e.g., a display, a speaker, a haptic feedback component, an audio or visual indicator, and/or the like).

Communication interface 670 includes a transceiver-like component (e.g., a transceiver, a separate receiver, a separate transmitter, and/or the like) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a wireless local area network interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. As used herein, the term "computer-readable medium" refers to a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

FIG. 7 is a flowchart of an example process 700 for detecting control plane node availability described herein. In some implementations, one or more process blocks of FIG. 7 may be performed by a bus accelerator (e.g., bus accelerator 526). In some implementations, one or more process blocks of FIG. 7 may be performed by another device or a group of devices separate from or including a bus accelerator, such as a base station (e.g., base station 422), an NSSF (e.g., NSSF 502), an AUSF (e.g., AUSF 504), a UDM (e.g., UDM 506), an NRF (e.g., NRF 508), an NEF (e.g., NEF 510), an AF (e.g., AF 512), an AMF (e.g., AMF 514), a UDSF (e.g., 516), a PCF (e.g., PCF 518), an SMF (e.g., SMF 522), and/or a UPF (e.g., UPF 524).

As shown in FIG. 7, process 700 may include transmitting a set of queries to a plurality of control plane nodes of a network (block 710). For example, the bus accelerator (e.g., using a processor 620, a memory 630, a storage component 640, an output component 660, and a communication interface 670, and/or the like) may transmit a set of queries to a plurality of control plane nodes of a network, as described above.

In some implementations, the plurality of control plane nodes are identified within a control plane of the network. In some implementations, the set of queries are transmitted based on determining that the UE is engaged in the communication session. The set of queries may include one or more transport layer queries.

The network may include a 5G NG core network. The plurality of control plane nodes may correspond to a plurality of NSSFs of the network. Additionally, or alternatively, the network may include a mesh network, and the plurality of control plane nodes may correspond to a plurality of control planes of routers of the network.

As further shown in FIG. 7, process 700 may include receiving, from the plurality of control plane nodes, a set of responses associated with the set of queries (block 720). For example, the bus accelerator (e.g., using a processor 620, a memory 630, a storage component 640, an input component 650, and a communication interface 670, and/or the like) may receive, from the plurality of control plane nodes, a set of responses associated with the set of queries, as described above.

As further shown in FIG. 7, process 700 may include determining respective characteristics for corresponding control plane nodes, of the plurality of control plane nodes, based on the set of responses (block 730). For example, the bus accelerator (e.g., using a processor 620, a memory 630, a storage component 640, an input component 650, and a communication interface 670, and/or the like) may determine respective characteristics for corresponding control plane nodes, of the plurality of control plane nodes, based on the set of responses, as described above.

In some implementations, at least one of the respective characteristics, for the corresponding control plane nodes, comprises one or more of a congestion level of a corresponding control plane node, an average service time associated with the corresponding control plane node, or a bearer availability associated with the corresponding control plane node. The congestion level may be determined based on a length of time between transmitting a query of the set of queries and receiving a corresponding response to the query. The average service time may be determined based on a length of time between transmitting a first query of the set of queries and receiving a response to a last query of the set of queries and a number of queries in the set of queries. The bearer availability may be determined based on a number of NSIs associated with the control plane node.

As further shown in FIG. 7, process 700 may include determining, based on the respective characteristics, scores for the corresponding control plane nodes, wherein the scores are representative of respective capabilities of the corresponding control plane nodes to be used for a communication session associated with a UE (block 740). For example, the bus accelerator (e.g., using a processor 620, a memory 630, a storage component 640, an input component 650, and a communication interface 670, and/or the like) may determine, based on the respective characteristics, scores for the corresponding control plane nodes, as described above. In some implementations, the scores are representative of respective capabilities of the corresponding control plane nodes to be used for a communication session associated with a UE.

In some implementations, the communication session is detected based on the UE being associated with traffic of a user data plane of the network. According to some implementations, the set of queries are caused to be transmitted based on detecting the communication session.

In some implementations, a score associated with the control plane node may be determined based on determining that the communication session has been requested. The scores for the corresponding control plane nodes may be determined based on adjustable weights of the respective characteristics. Additionally, or alternatively, the scores are further based on a characteristic of the UE.

As further shown in FIG. 7, process 700 may include mapping, in a data structure associated with the network, the scores to the corresponding control plane nodes, wherein the scores are used to select a control plane node, from the plurality of control plane nodes, for the communication session (block 750). For example, the bus accelerator (e.g., using a processor 620, a memory 630, a storage component 640, an input component 650, and a communication interface 670, and/or the like) may map, in a data structure associated with the network, the scores to the corresponding control plane nodes, as described above. In some implementations, the scores are used to select a control plane node, from the plurality of control plane nodes, for the communication session. The data structure may include an unstructured data storage function of the network.

According to some implementations the bus accelerator may select (or enable selection of), based on the scores, a control plane node, from the plurality of control plane nodes, for the communication session and configure the control plane node to perform a control operation for the communication session.

Process 700 may include additional implementations, such as any single implementation or any combination of implementations described in connection with one or more other processes described elsewhere herein.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    identifying, by a device, a control plane node of a plurality of control plane nodes associated with a control plane of a network;
    transmitting, by the device, a set of queries to the control plane node,
        wherein the set of queries comprise a request for information that indicates a number of network slice instances (NSIs) associated with the control plane node;
    receiving, by the device and from the control plane node, a set of responses associated with the set of queries;
    determining, by the device, a characteristic of the control plane node based on the set of responses,
        wherein the characteristic is based on information indicating bearer availability associated with the control plane node that is based on the number of NSIs associated with the control plane node, and
        wherein the characteristic is based on an average service time associated with the control plane node,
            wherein the average service time is determined based on a length of time between transmitting a first query of the set of queries and receiving a response to a last query of the set of queries;
    determining, by the device and based on the characteristic, a score associated with the control plane node,
        wherein the score represents an availability of the control plane node for a communication session associated with a user equipment; and
    mapping, by the device in a data structure, the score to the control plane node,
        wherein the score is used to select the control plane node from the plurality of control plane nodes for the communication session.

2. The method of claim 1, wherein the score associated with the control plane node is based on determining that the communication session has been requested.

3. The method of claim 1, wherein the set of queries comprise one or more transport layer queries.

4. The method of claim 1, wherein the length of time is a first length of time,
    wherein the characteristic comprises information indicating a congestion level of the control plane node,
        wherein the information indicating the congestion level is determined based on a second length of time between transmitting a query of the set of queries and receiving a corresponding response to the query.

5. The method of claim 1, wherein the control plane node comprises a network slice selection function (NSSF) of the network.

6. The method of claim 1, wherein the data structure comprises an unstructured data storage function of the network.

7. A device, comprising:
one or more memories; and
one or more processors communicatively coupled to the one or more memories, configured to:
transmit a set of queries to a plurality of control plane nodes of a network,
wherein the set of queries comprise a request for information that indicates a number of network slice instances (NSIs) associated with corresponding control plane nodes of the plurality of control plane nodes;
receive, from the plurality of control plane nodes, a set of responses associated with the set of queries;
determine respective characteristics for the corresponding control plane nodes based on the set of responses,
wherein the respective characteristics are based on information indicating bearer availability associated with the corresponding control plane nodes that is based on the number of NSIs associated with the corresponding control plane nodes,
wherein the respective characteristics are based on an average service time associated with the corresponding control plane nodes,
wherein the average service time is determined based on a length of time between transmitting a first query of the set of queries and receiving a response to a last query of the set of queries;
determine, based on the respective characteristics, scores for the corresponding control plane nodes,
wherein the scores are representative of respective capabilities of the corresponding control plane nodes to be used for a communication session associated with a user equipment; and
map, in a data structure associated with the network, the scores to the corresponding control plane nodes,
wherein the scores are used to select a control plane node, from the plurality of control plane nodes, for the communication session.

8. The device of claim 7, wherein at least one of the respective characteristics, for the corresponding control plane nodes, further comprises one or more of:
information indicating a congestion level of a corresponding control plane node, or
information indicating bearer availability associated with the corresponding control plane node.

9. The device of claim 7, wherein the scores for the corresponding control plane nodes are determined based on adjustable weights of the respective characteristics.

10. The device of claim 7, wherein the set of queries are transmitted based on determining that the user equipment is engaged in the communication session, and
wherein the communication session is associated with transmitting data via a user data plane of the network.

11. The device of claim 7, wherein the network comprises a 5G Next Generation (NG) core network, and
wherein the plurality of control plane nodes correspond to a plurality of network slice selection functions (NSSFs) of the 5G NG core network.

12. The device of claim 7, wherein the network comprises a mesh network,
and the plurality of control plane nodes correspond to a plurality of control planes of routers of the network.

13. A non-transitory computer-readable medium storing instructions, the instructions comprising:
one or more instructions that, when executed by one or more processors, cause the one or more processors to:
detect a communication session between a user equipment and a network;
cause, based on detecting the communication session, a set of queries to be transmitted to a plurality of control plane nodes of the network,
wherein the set of queries comprise a request for information that indicates a number of network slice instances (NSIs) associated with corresponding control plane nodes of the plurality of control plane nodes;
determine, based on a set of responses associated with the set of queries, respective characteristics for the corresponding control plane nodes,
wherein the respective characteristics are based on information indicating bearer availability associated with the corresponding control plane nodes that is based on the number of NSIs associated with the corresponding control plane nodes, and
wherein the respective characteristics are based on an average service time associated with the corresponding control plane nodes,
wherein the average service time is determined based on a length of time between transmitting a first query of the set of queries and receiving a response to a last query of the set of queries;
determine, based on the respective characteristics, scores for the corresponding control plane nodes,
wherein the scores are representative of respective capabilities of the corresponding control plane nodes to be used for the communication session;
select, based on the scores, a control plane node, from the plurality of control plane nodes, for the communication session; and
configure the control plane node to perform a control operation for the communication session.

14. The non-transitory computer-readable medium of claim 13, wherein the communication session is detected based on the user equipment being associated with traffic of a user data plane of the network.

15. The non-transitory computer-readable medium of claim 13, wherein each of the respective characteristics, for the corresponding control plane nodes, further comprises at least one of:
information indicating a congestion level of a corresponding control plane node, or
information indicating bearer availability associated with the corresponding control plane node.

16. The non-transitory computer-readable medium of claim 13, wherein the scores are further based on a characteristic of the user equipment.

17. The non-transitory computer-readable medium of claim 13, wherein the plurality of control plane nodes correspond to a plurality of network slice selection functions (NSSFs) of the network.

18. The non-transitory computer-readable medium of claim 13, wherein the network comprises a mesh network, and the plurality of control plane nodes correspond to a plurality of control planes of routers of the network.

19. The method of claim 1, wherein the network comprises a 5G Next Generation (NG) core network, and wherein the plurality of control plane nodes correspond to a plurality of network slice selection functions (NSSFs) of the 5G NG core network.

20. The non-transitory computer-readable medium of claim 13, wherein the network comprises a 5G Next Generation (NG) core network, and
wherein the plurality of control plane nodes correspond to a plurality of network slice selection functions (NSSFs) of the 5G NG core network.

\* \* \* \* \*